No. 695,721. Patented Mar. 18, 1902.
V. H. HALLOCK.
WEEDER.
(Application filed Nov. 26, 1901.)

(No Model.)

Witnesses:
G. W. Wright
S. C. Connor

Inventor
Valentine H. Hallock
by his attorneys
Howson and Howson

THE NORRIS PETERS CO., PHOTO-LITHO., WASHINGTON, D. C.

UNITED STATES PATENT OFFICE.

VALENTINE H. HALLOCK, OF NEW YORK, N. Y.

WEEDER.

SPECIFICATION forming part of Letters Patent No. 695,721, dated March 18, 1902.

Application filed November 26, 1901. Serial No. 83,764. (No model.)

*To all whom it may concern:*

Be it known that I, VALENTINE H. HALLOCK, a citizen of the United States, residing at New York, in the borough of Queens, in the county of Queens, State of New York, have invented an Improved Weeder, of which the following is a specification.

The object of my invention is to construct an improved surface-weeding machine adapted for use on grown or partly-grown crops, especially when planted in rows, whether hilled or not. This object I attain in the manner which I will now describe.

Figure 1:
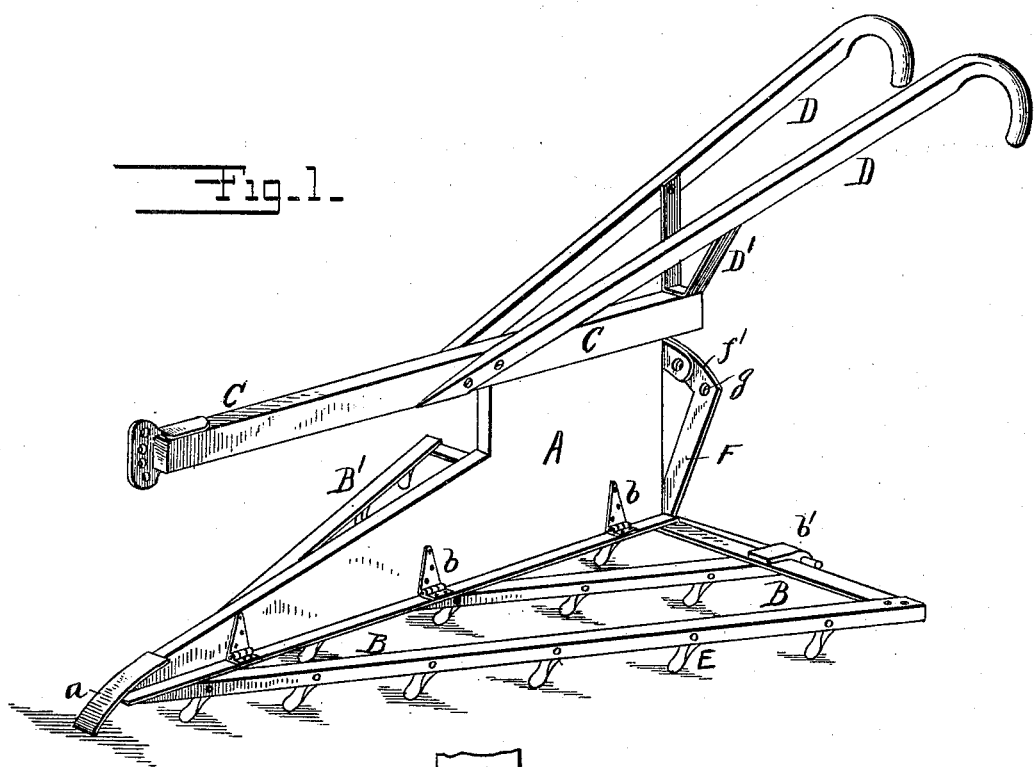
Figure 2:
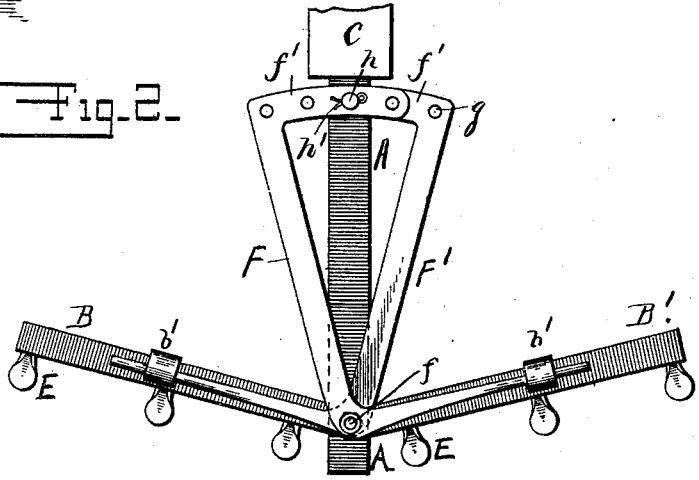
Figure 3:
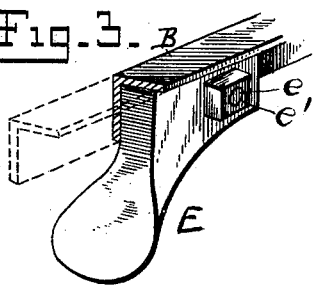

In the accompanying drawings, Figure 1 is a perspective view of my improved weeder as adjusted for use on level ground. Fig. 2 is an enlarged rear view of the same when adjusted for use between hilled rows. Fig. 3 is an enlarged perspective view of one of the weeder-teeth and part of the frame.

Weeding-machines as ordinarily constructed are not applicable to the weeding of ground in which there is a grown or partly-grown crop, and especially are not applicable to the weeding of such crops when in hilled rows, because of the damage which such machines will do to the crops.

My improved weeder is constructed for use between the rows of growing crops, whether hilled or not, and the weeder is of such a character that it will efficiently pull out the weeds without injuring either the roots, stems, or leaves of the growing crops. My weeder is especially useful for potatoes, which it has heretofore been found impossible to weed except with the hand-hoe when the potatoes have been hilled or the crop has grown or partly grown.

My weeding-machine comprises a longitudinal upright frame A, which may be simply a board. It has affixed to its lower edge on opposite sides two triangular frames B B', widest at the back and each coming to a point at the front. The forward half of the central frame A has its upper edge inclined downward toward the point of the frames B B', somewhat like a plow, to aid in parting the overhanging branches of the crops. At the extreme forward end of this frame A is a downwardly-projecting tooth or share $a$. On the rear half of the upright frame A is mounted a longitudinal draft-beam C, having at its forward end a suitable clevis, to which the draft-horse can be hitched, as in the case of a plow. To this same beam are fixed the upwardly-inclined guiding-handles D D, braced by a V-shaped metal brace D' on the rear end of the beam C. Each of the triangular frames is preferably composed of angle-irons bolted together and having detachably secured to the upright flanges of the angle-irons by bolts and nuts $e\ e'$ short forwardly-projecting cultivator-teeth E, Fig. 3. The two frames thus constructed are hinged to the opposite sides of the central frame A, near the lower edge of the latter, by means of suitable pivots or hinges $b\ b$. I provide means for securing the frames B B' in different angular positions, according to the character of the ground on which the weeder is to be used. Thus where the weeder is to be used between hilled rows the frames B B' are secured in upwardly-inclined positions, such as shown in Fig. 2; but when the machine is to be used between unhilled rows the two side frames B B' may be adjusted to lie in the same plane, as shown in Fig. 1. For this purpose and because it is important to leave the space over the side frames free from obstructions I prefer the form of adjusting devices more clearly shown in Fig. 2. At the back of the central frame A on a line with the hinges is a pivot $f$, on which are mounted two elbow-levers F F', connected at their lower outer ends by staples $b'\ b'$ to the back ends of the frames B B', one staple in each frame. Each elbow-lever carries at its upper end an inwardly-projecting quadrant $f'$ with holes $g$, to be fitted over a fixed pin $h$ on the frame A. There is sufficient play at the pivot $f$ to allow these quadrants to be pushed on or off the pin $h$; but a cotter-pin $h'$ will hold the quadrants on the pin $h$ when the frames have been adjusted to the desired angle.

The total width of the weeder at the back ends of the rakes is somewhat less than the usual width between rows of plants, so that the machine can be drawn down the furrow with the frames B B' passing freely under the overhanging branches or leaves of the plants to pull the weeds out of the ground between the rows without damaging either the roots, stems, branches, or leaves of the growing plants under cultivation. The bottom edge of the narrow upright frame A serves as a gage for the depth to which the cultivator-teeth will enter the ground. These cultivator-teeth being short, the bars of the side frames B B' also serve as such gages.

I claim as my invention—

1. A weeding-machine consisting of a central upright frame with handles and with side frames secured to the opposite sides of said central frame and carrying short forwardly-projecting cultivator-teeth, substantially as described.

2. A weeder, comprising an upright frame having side frames hinged to the opposite sides of the upright frame and carrying short forwardly-projecting cultivator-teeth, as and for the purpose described.

3. A weeder, comprising an upright frame having its upper edge downwardly inclined toward the front, a longitudinal draft-beam at the top of its rear part and side frames secured to the opposite sides of the upright frame, near its lower edge, said side frames carrying short forwardly-projecting cultivator-teeth, substantially as described.

4. A weeder, comprising an upright frame with side frames hinged to the opposite sides of the upright frame and having cultivator-teeth, elbow-levers pivoted to the frame and connected at their lower outer ends to the rake-frames and provided at their upper ends with means for securing the levers in different adjusted positions.

In testimony whereof I have signed my name to this specification in the presence of two subscribing witnesses.

VALENTINE H. HALLOCK.

Witnesses:
HUBERT HOWSON,
F. WARREN WRIGHT.